(12) United States Patent
Brown et al.

(10) Patent No.: US 9,764,637 B2
(45) Date of Patent: Sep. 19, 2017

(54) FUEL TANK MOUNTED REFUELING DEVICE

(71) Applicants: Christopher Brown, Merritt Island, FL (US); Marvin Peplow, Bartlett, IL (US)

(72) Inventors: Christopher Brown, Merritt Island, FL (US); Marvin Peplow, Bartlett, IL (US)

(73) Assignee: BlueSkies International, LLC, Nashville, TN (US)

( * ) Notice: Subject to any disclaimer, the term of this patent is extended or adjusted under 35 U.S.C. 154(b) by 39 days.

(21) Appl. No.: 14/720,060

(22) Filed: May 22, 2015

(65) Prior Publication Data

US 2015/0343896 A1    Dec. 3, 2015

Related U.S. Application Data

(60) Provisional application No. 62/001,899, filed on May 22, 2014.

(51) Int. Cl.
| | |
|---|---|
| *B60K 15/04* | (2006.01) |
| *B60K 15/073* | (2006.01) |
| *B60K 15/03* | (2006.01) |
| *B60K 15/035* | (2006.01) |

(52) U.S. Cl.
CPC .......... *B60K 15/04* (2013.01); *B60K 15/035* (2013.01); *B60K 2015/03263* (2013.01); *B60K 2015/03493* (2013.01); *B60K 2015/03538* (2013.01); *B60K 2015/03552* (2013.01); *B60K 2015/0432* (2013.01); *B60K 2015/0458* (2013.01); *Y10T 29/49883* (2015.01)

(58) Field of Classification Search
CPC ...... B60K 15/04; B60K 15/03; B60K 15/073; B60K 15/03177; B60K 2015/0432; B60K 2015/03263; B60K 2015/03493; B60K 2015/03032; B60K 2015/03059; B60K 2015/03394; B60K 2015/0458; B60K 2015/047; B60K 2015/0467; B60K 2015/0477; B60K 15/035; B60K 2015/03538; B60K 2015/03552
USPC ................................................ 220/86.1, 86.2
See application file for complete search history.

(56) References Cited

U.S. PATENT DOCUMENTS

| | | | | |
|---|---|---|---|---|
| 5,538,055 | A * | 7/1996 | Kunz | B60K 15/04 137/588 |
| 2007/0210607 | A1* | 9/2007 | Murabayashi | B60K 15/03519 296/97.22 |
| 2011/0308662 | A1* | 12/2011 | Brown | B60K 15/03 141/1 |

* cited by examiner

*Primary Examiner* — Andrew Perreault
(74) *Attorney, Agent, or Firm* — Clifford H. Kraft

(57) ABSTRACT

A refueling device that when mounted to a marine fuel tank facilitates refueling and minimizes the propensity for both spit-back and well back while simultaneously allowing a free flowing open pathway through which vapors generated by the refueling event may pass unencumbered.

6 Claims, 1 Drawing Sheet

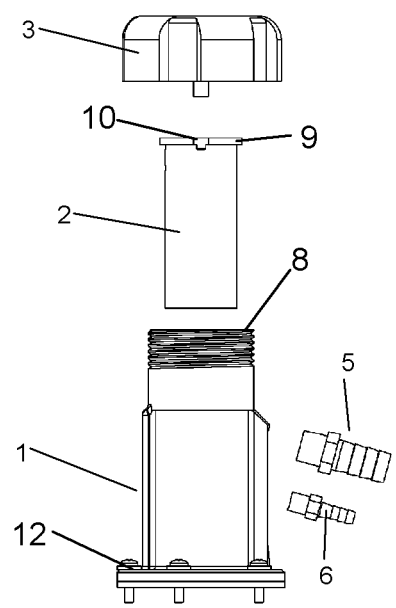
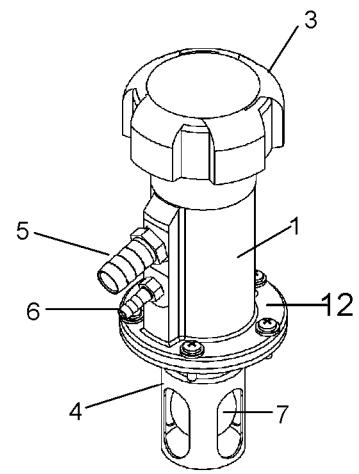
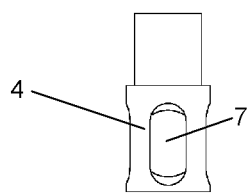
FIG. 2
FIG. 1

FUEL TANK MOUNTED REFUELING DEVICE

This application is related to and claims priority to U.S. Provisional Patent Application No. 62/001,899 filed May 22, 2014. Application 62/001,899 is hereby incorporated by reference in its entirety.

BACKGROUND

Field of the Invention

The present invention relates generally to marine refueling and more particularly to a fuel tank mounted refueling device.

Description of the Problem

The US EPA has introduced refueling protocols for marine pleasure vessels (boats) into the Code of Federal Regulations Chapter 40 Parts 1060 et seq. namely and specifically that an operator (the person refueling) can reasonably expect not to experience a Spitback or well-back event. Such an event leads to fuel spillage and creates the danger of fire and bodily harm.

SUMMARY OF THE INVENTION

The present invention is a refueling device that when mounted to a marine fuel tank facilitates refueling and minimizes the propensity for both spit-back and well back while simultaneously allowing a free flowing open pathway through which vapors generated by the refueling event may pass unencumbered.

DESCRIPTION OF THE FIGURES

Attention is now directed to several drawings the illustrate features of the present invention.

FIG. 1 shows an embodiment of the present invention in exploded view.

FIG. 2 shows the embodiment of FIG. 1 assembled.

Several illustrations have been provided to aid in understanding the present invention. The scope of the present invention is not limited to what is shown in the figures.

DESCRIPTION OF THE PREFERRED EMBODIMENTS

The present invention is a refueling device that when mounted to a marine fuel tank facilitates refueling and minimizes the propensity for both spit-back and well back while simultaneously allowing a free flowing open pathway through which vapors generated by the refueling event may pass unencumbered.

The device consists of two parts that can be made from metal or composite materials and has several features that have specific functions during the refueling event.

The first part of the device is an exterior body 1 of the spout. The body is designed with a flange 12 as to enable attachment to a fuel tank exterior surface using fasteners. The exterior body 1 of the spout has a thread 8 or tabs at the uppermost part to which a fuel cap 3 can be fastened for sealing purposes. The exterior body of the spout has sufficient mass to enable the attachment of hose barb fittings 5, 6 for the purpose of conveying refueling or venting fuel vapors.

The second part of the device is an interior sleeve 2 of the spout. The interior sleeve of the spout crates a chamber through which refueling or venting fuel vapors may be conveyed separated from the fuel tank interior for the purpose of escape during refueling or venting. The interior sleeve 2 of the spout mates to the interior diameter of the exterior body 1 of the spout and has an internal diameter that takes a typical refueling nozzle by a clearance dimension of greater than approximately $\frac{1}{32}$" and smaller than approximately $\frac{1}{4}$" of the total nozzle exterior diameter. This small clearance creates a physical barrier to minimize raw fuel splash commonly known as spit-back or well back. The interior sleeve 2 of the spout has an upper flange 9 that contains smaller holes 10 that in total make up the same area as approximately a $\frac{5}{8}$" diameter hole. The flange holes 10 provide an unencumbered escape path from the chamber created by the mating together of the exterior body of the spout and the interior sleeve of the spout, for fuel vapors generated during the refueling event or normal tank venting.

The lower part of the device is a ball valve with a housing 4 and a ball 7 that prevents any backflow. The present invention includes the following features:

A chambered mountable marine fuel tank refueling spout device

A spit-back and well-back barrier method

A pathway for refueling vapors

A pathway for venting vapors

Several descriptions and illustrations have been presented to aid in understanding the present invention. One with skill in the art will realize that numerous changes and variations may be made without departing from the spirit of the invention. Each of these changes and variations is within the scope of the present invention.

We claim:

1. A fuel tank mounted refueling device comprising:
    a cylindrical body having a lower flange adapted to allow direct attachment of the body to a marine tank, the body having an upper threaded portion configured to receive and secure a fuel cap;
    a cylindrical sleeve of smaller diameter than the cylindrical body adapted to be inserted into the cylindrical body, the sleeve having an upper flange containing a plurality of vent holes, the vent holes constructed to allow an escape path for fuel vapors generated during refueling;
    the sleeve being constructed to receive a refueling hose with a fit sufficiently tight to minimize fuel splash;
    a lower section attachable to the cylindrical body that includes a housing with a ball valve, said ball valve constructed to fuel prevent backflow.

2. The fuel tank mounted refueling device of claim 1 wherein said plurality of holes has a total area of $\frac{5}{8}$ inch.

3. The fuel tank mounted refueling device of claim 1 further comprising lower and upper hose barb fittings attached to the cylindrical body in fluid communication with the vent holes, the hose barb fittings constructed to vent vapors into tubing and not into the atmosphere.

4. The fuel tank mounted refueling device of claim 1 wherein the body and sleeve are molded plastic.

5. A fuel tank mounted refueling device comprising:
    a cylindrical body having a lower flange adapted to allow direct attachment of the body to a marine tank, the body having an upper threaded portion configured to receive and secure a fuel cap;
    a cylindrical sleeve of smaller diameter than the cylindrical body adapted to be inserted into the cylindrical body, the sleeve having an upper flange containing a plurality of vent holes, the vent holes constructed to allow an escape path for fuel vapors generated during refueling;

the sleeve being constructed to receive a refueling hose with a fit sufficiently tight to prevent fuel splash;

a lower section attachable to the cylindrical body that includes a housing with a ball valve, said ball valve constructed to fuel prevent backflow;

a pair of hose barb fittings attached to the cylindrical body in vapor communication with the vent holes, the hose barb fittings constructed to convey vapors from the vent holes into tubing rather than into the atmosphere.

6. The fuel tank mounted refueling device of claim 5 wherein the body and sleeve are molded plastic.

* * * * *